United States Patent
Chen et al.

(10) Patent No.: US 7,626,452 B2
(45) Date of Patent: Dec. 1, 2009

(54) DRIVING CIRCUIT TO AVOID REVERSE CURRENT FOR SOFT SWITCHING DC MOTOR

(75) Inventors: Kun-Min Chen, Changhua County (TW); Shen-Min Lo, Hsinchu (TW); Ching-Sheng Li, Hsinchu County (TW); Chen-Yu Yuan, Taipei (TW)

(73) Assignee: Anpec Electronics Corporation, Hsin-Chu (TW)

( * ) Notice: Subject to any disclaimer, the term of this patent is extended or adjusted under 35 U.S.C. 154(b) by 631 days.

(21) Appl. No.: 11/383,219

(22) Filed: May 15, 2006

(65) Prior Publication Data

US 2007/0221997 A1 Sep. 27, 2007

(30) Foreign Application Priority Data

Mar. 22, 2006 (TW) .............................. 95109902 A

(51) Int. Cl.
*H03F 15/00* (2006.01)
(52) U.S. Cl. ............ 330/6; 257/E43.002; 257/E43.003; 257/E27.005
(58) Field of Classification Search .......... 257/E43.002, 257/E43.003, E27.005; 330/6
See application file for complete search history.

(56) References Cited

U.S. PATENT DOCUMENTS

| 6,392,902 | B1 | 5/2002 | Jang |
| 7,009,850 | B2 | 3/2006 | Jitaru |
| 2004/0000883 | A1* | 1/2004 | Alex et al. .................. 318/254 |

FOREIGN PATENT DOCUMENTS

| TW | 556402 | 10/2003 |
| TW | I247479 | 1/2006 |

* cited by examiner

*Primary Examiner*—Matthew E Warren
(74) *Attorney, Agent, or Firm*—Winston Hsu

(57) ABSTRACT

A driving circuit includes a power supply, an input capacitor, a Hall sensor, a first amplifier, a second amplifier, a full-bridge driver circuit, and a first operational amplifier. The input capacitor is coupled to the power supply. The input end of the first amplifier and the second amplifier is coupled to the output end of the Hall sensor. The control end of the full-bridge driver circuit is coupled to the output end of the first amplifier and the output end of the second amplifier. The first operational amplifier includes a first input end for receiving a first reference voltage and a second input end coupled to the first output end of the full-bridge driver circuit.

11 Claims, 11 Drawing Sheets

DRIVING CIRCUIT TO AVOID REVERSE CURRENT FOR SOFT SWITCHING DC MOTOR

BACKGROUND OF THE INVENTION

1. Field of the Invention

The present invention relates to a soft switching DC motor driver and a related driving circuit for avoiding reverse current, and more particularly, to a soft switching DC motor driver and a related driving circuit for avoiding reverse current by using operational amplifiers for fixing output voltages.

2. Description of the Prior Art

A DC motor driver is a necessary power transformation device in modern industries and information society. The DC motor is capable of transforming electricity into kinetic energy required for driving devices. Conventional motors include DC motors, AC motors, and stepping motors. DC motors and AC motors are often applied in products not requiring delicate manipulations. For example, blades of an electric fan are rotated with a DC motor or an AC motor. As the technology of digital products grows, a rotation rate of a DC motor or an AC motor is required to be faster and faster. However, with a high rotation rate of a motor, the current of the motor cannot be consumed completely. The unconsumed and therefore remaining currents reversely flow to a corresponding power supply. This scenario leads to damages of controllers and drivers of the motor. Therefore, the damages caused by reverse current under a high rotation rate of the motor have to be avoided.

Please refer to FIG. 1, which is a diagram of a prior art soft switching DC motor driver 10. The soft switching DC motor driver 10 comprises a power supply 12, an input capacitor C1, a hall sensor 16, a first amplifier AMP1, a second amplifier AMP2, and a full-bridge driver circuit 14. The power supply 12 is utilized for generating an input voltage Vin. The input capacitor C1 is coupled to the power supply 12. A voltage difference between both terminals of the input capacitor C1 is a supply voltage VDD. The Hall sensor 16 has a first output end 162 for generating a first timing control signal H+, and a second output end 164 for generating a second timing control signal H−. The first amplifier AMP1 has a first input end 102 coupled to the first output end 162 of the Hall sensor 16, a second input end 104 coupled to the second output end 164 of the Hall sensor 16, a first output end 106, and a second output end 108. The first amplifier AMP1 is utilized for amplifying signals inputted from the first input end 102 and the second input end 104. The second amplifier AMP2 has a first input end 112 coupled to the second output end 164 of the Hall sensor 16, a second input end 114 coupled to the first output end 162 of the Hall sensor 16, a first output end 116, and a second output end 118. The second amplifier AMP2 is utilized for amplifying signals inputted from the first input end 112 and the second input end 114. The full-bridge driver circuit 14 has an input end 142 coupled to the power supply 12 and the input capacitor C1, and the voltage at the input end 142 is the supply voltage VDD. The full-bridge driver circuit 14 comprises a first switch SW1, a second switch SW2, a third switch SW3, a fourth switch SW4. The inductor L is modeled as a motor. The first switch SW1 has a control terminal 132 coupled to the first output end 106 of the first amplifier AMP1, an input end 134 coupled to the power supply 12 and the input capacitor C1, and an output end 136 for generating a first output voltage Vout1. The second switch SW2 has a control terminal 152 coupled to the second output end 108 of the first amplifier AMP1, an input end 154 coupled to ground, and an output end 156 coupled to the output end 136 of the first switch SW1. The third switch SW3 has a control terminal 172 coupled to the first output end 116 of the second amplifier AMP2, an output end 174 coupled to the power supply 12 and the input capacitor C1, and an output end 176 for generating a second output voltage Vout2. The fourth switch SW4 has a control terminal 192 coupled to the second output end 118 of the second amplifier AMP2, an input end 194 coupled to ground, and an output end 196 coupled to the output end 176 of the third switch SW3. The inductor L has a first terminal 182 coupled to the first switch SW1 and the second switch SW2, and a second terminal 184 coupled to the third switch SW3 and the fourth switch SW4. The soft switching DC motor driver 10 further comprises a protecting diode D1 coupled to the power supply 12 and the input capacitor C1 for protecting the power supply 12 and for preventing reverse current, which may burn down the entire integrated circuit. The first switch SW1, the second switch SW2, the third switch SW3, and the fourth switch SW4 may be metal-oxide semiconductor transistors, the first switch SW1 and the third switch SW3 are P-type metal-oxide semiconductor transistors, and the second switch SW2 and the fourth switch SW4 are N-type metal-oxide semiconductor transistors. The first switch SW1, the second switch SW2, the third switch SW3, and the fourth switch SW4 may also be bipolar-junction transistors, the first switch SW1 and the third switch SW3 are npn bipolar-junction transistors, and the second switch SW2 and the fourth switch SW4 are pnp bipolar-junction transistors.

Please refer to FIG. 1 and FIG. 2. FIG. 2 is a waveform diagram of the signals shown in FIG. 1. The soft switching DC motor driver 10 controls the switches of the full-bridge driver circuit 14 by soft switching driving techniques. Therefore, waveforms of the first output voltage Vout1 and the second output voltage Vout2 are trapezoidal waves for mitigating high-frequency voltage pulse of the soft switching DC motor driver 10 during transitions and a voltage impulse caused by reverse current. Therefore, low noises of the soft switching DC motor driver 10 is achieved and the reliability of the soft switching DC motor driver 10 is also enhanced.

Please refer to FIG. 2 again. The first timing control signal H+ and the second timing control signal H−, which are outputted by the Hall sensor 16, are utilized for controlling the first switch SW1, the second switch SW2, the third switch SW3, and the fourth switch SW4. When the first timing control signal H+ is low and the second timing control signal H− is high, the first switch SW1 and the fourth switch SW4 are turned on, and the second switch SW2 and the third switch SW3 are turned off. An inductance current flows $I_L$ from the first output voltage Vout1 to the second output voltage Vout2, at this time, the first output voltage Vout1 is high, and the second output voltage Vout2 is low. During the transition of the first timing control signal H+ and the second timing control signal H−, the second switch SW2 and the fourth switch SW4 are turned on, and the first switch SW1 and the third switch SW3 are turned off. The inductance current $I_L$ weakens gradually through the second switch SW2 and the fourth switch SW4. At this time, the waveform of the first output voltage Vout1 descends linearly during a transient whereas the waveform of the second output voltage Vout2 ascends linearly during the transient. When the first timing control signal H+ is high and the second timing control signal H− is low, the second switch SW2 and the third switch SW3 are turned on, and the first switch SW1 and the fourth switch SW4 are turned off. The inductance current $I_L$ flows from the second output voltage Vout2 to the first output voltage Vout1, at this time, the first output voltage Vout1 is low, and the second output voltage Vout2 is high.

Please refer to FIG. 3, which is a waveform diagram of the signals of FIG. 1 when a high rotation rate of the soft switching DC motor results in a voltage impulse. During the first stage, the first timing control signal H+ is low, and the second timing control signal H− is high. The inductance current $I_L$ flows from the first output voltage Vout1 to the second output voltage Vout2, at this time, the first output voltage Vout1 is high, and the second output voltage Vout2 is low. During the second stage and the transition of the first timing control signal H+ and the second timing control signal H−, the inductance current $I_L$ weakens gradually through the second switch SW2 and the fourth switch SW4. However, since the rotation rate of the soft switching DC motor is high, the inductance current $I_L$ cannot be weakened to be zero after the transition of the switches. Therefore, during the third stage, the inductance current $I_L$ flows reversely to the supply voltage VDD through the second switch SW2 and the fourth switch SW4, and charges the input capacitor to result in a voltage impulse. As shown in FIG. 3, the magnitude of the voltage impulse depends on the magnitude of the reverse current flowing into the input capacitor C1 and the capacitance of the input capacitor C1. During the fourth stage when the first timing control signal H+ turns to high and the second timing control signal H− turns to low, the inductance current $I_L$ flows from the second output voltage Vout2 to the fist output voltage Vout1, at this time, the first output voltage Vout1 is low, and the second output voltage Vout2 is high.

Please refer to FIG. 4, which is a diagram illustrating the flow of the inductance current $I_L$ during the first stage shown in FIG. 3. During the first stage, the first amplifier AMP1 and the second amplifier AMP2 are saturated, and the first switch SW1 and the fourth switch SW4 are fully on. The inductance current $I_L$ flows from the first output voltage Vout1 to the second output voltage Vout2.

Please refer to FIG. 5, which is a diagram illustrating the flow of the inductance current $I_L$ during the second stage shown in FIG. 3. During the second stage, a feedback loop of both the first amplifier AMP1 and the second amplifier AMP2 begins working, then the first output voltage Vout1 descends linearly whereas the second output voltage Vout2 ascends linearly. At this time, the inductance current $I_L$ weakens gradually, and the first switch SW1 and the fourth switch SW4 are turned on. The inductance current $I_L$ continues to flow from the first output voltage Vout1 to the second output voltage Vout2.

Please refer to FIG. 6, which is a diagram illustrating the flow of the inductance current $I_L$ during the third stage shown in FIG. 3. During the third stage and when the first output voltage Vout1 falls below −0.7 volts, since diode of the second switch SW2 is turned on, the feed back loop due to the first amplifier AMP1 is broken, and the switch SW1 no longer provides current to the soft switching DC motor driver 10, therefore, the first switch SW1 is turned off whereas the second switch SW2 is fully on. Similarly, when the second output voltage Vout2 increases over (VDD+0.7) volts, the fourth switch SW4 is turned off whereas the second switch SW2 is turned on. At this time, the inductance current $I_L$ charges the input capacitor C1 to increase the supply voltage VDD and to result in a voltage impulse.

Please refer to FIG. 7, which is a diagram illustrating the flow of the inductance current $I_L$ during the fourth stage shown in FIG. 3. During the fourth stage, since the inductance current $I_L$ has weakened to be zero, the second switch SW2 and the third switch SW3 are turned on whereas the first switch SW1 and the fourth switch SW4 are turned off. The inductance current $I_L$ flows from the second output voltage Vout2 to the first output voltage Vout1.

For a DC motor having a low rotation rate, controlling the switches of the full-bridge driver circuit 14 with the soft switching driving techniques may mitigate the high frequency voltage pulse of the soft switching DC motor driver 10 during the transition and the voltage impulse caused by the reverse current. However, in modern applications, the rotation rate of a modern motor is ever increasing. When the rotation rate of the motor exceeds a limit, the inductance current $I_L$ has not weakened to be zero after the transition of the switches. At this time, the inductance current $I_L$ flows reversely to the supply voltage VDD through the second switch SW2 and the fourth switch SW4, and charges the input capacitor C1 to result in the voltage impulse. Therefore, the controller and the driver of the soft switching DC motor driver 10 would be damaged or burned down, the power supply 12 may be burned down also, and the reliability and the effective operational range of the system of the soft switching DC motor driver 10 would be degraded.

SUMMARY OF THE INVENTION

The claimed invention provides a soft switching DC motor driver to avoid reverse current. The soft switching DC motor driver comprises a power supply for generating an input voltage, an input capacitor coupled to the power supply, a Hall sensor having a first output end for generating a first timing control signal, and a second output end for generating a second timing control signal, a first amplifier having a first input end coupled to a first output end of the Hall sensor, a second input end coupled to a second output end of the Hall sensor, a first output end, and a second output end, the first amplifier being utilized for amplifying the first input signal and the second input signal of the first amplifier, a second amplifier having a first input end coupled to the second output end of the Hall sensor, a second input end coupled to the first output end of the hall sensor, a first output end, and a second output end, the second amplifier being utilized for amplifying the first input signal and the second input signal of the second amplifier, a full-bridge driver circuit having an input end coupled to the power supply and the input capacitor, a first control terminal coupled to the first output end of the first amplifier, a second control terminal coupled to the second output end of the first amplifier, a third control terminal coupled to the first output end of the second amplifier, a fourth control terminal coupled to the second output end of the second amplifier, a first output end for generating a first output voltage, and a second output end for generating a second output voltage, and a first operational amplifier having a first input end for receiving a first reference voltage, a second input end coupled to the first output end of the full-bridge driver circuit, and an output end coupled to a control terminal of the first amplifier, the first operational amplifier for controlling output voltages of the first amplifier.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
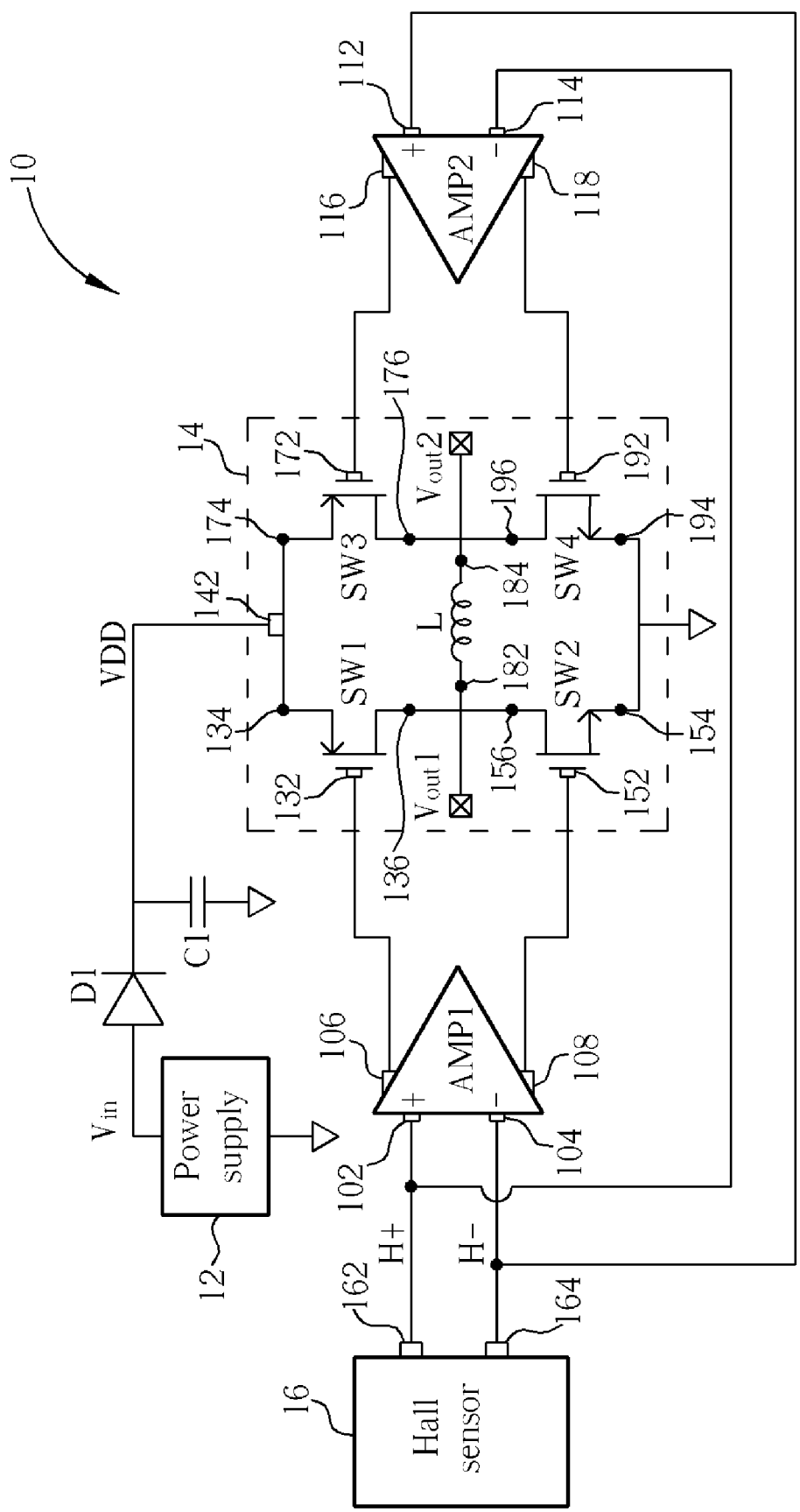
FIG. 1 is a diagram of a prior art soft switching DC motor driver.
Figure 2:
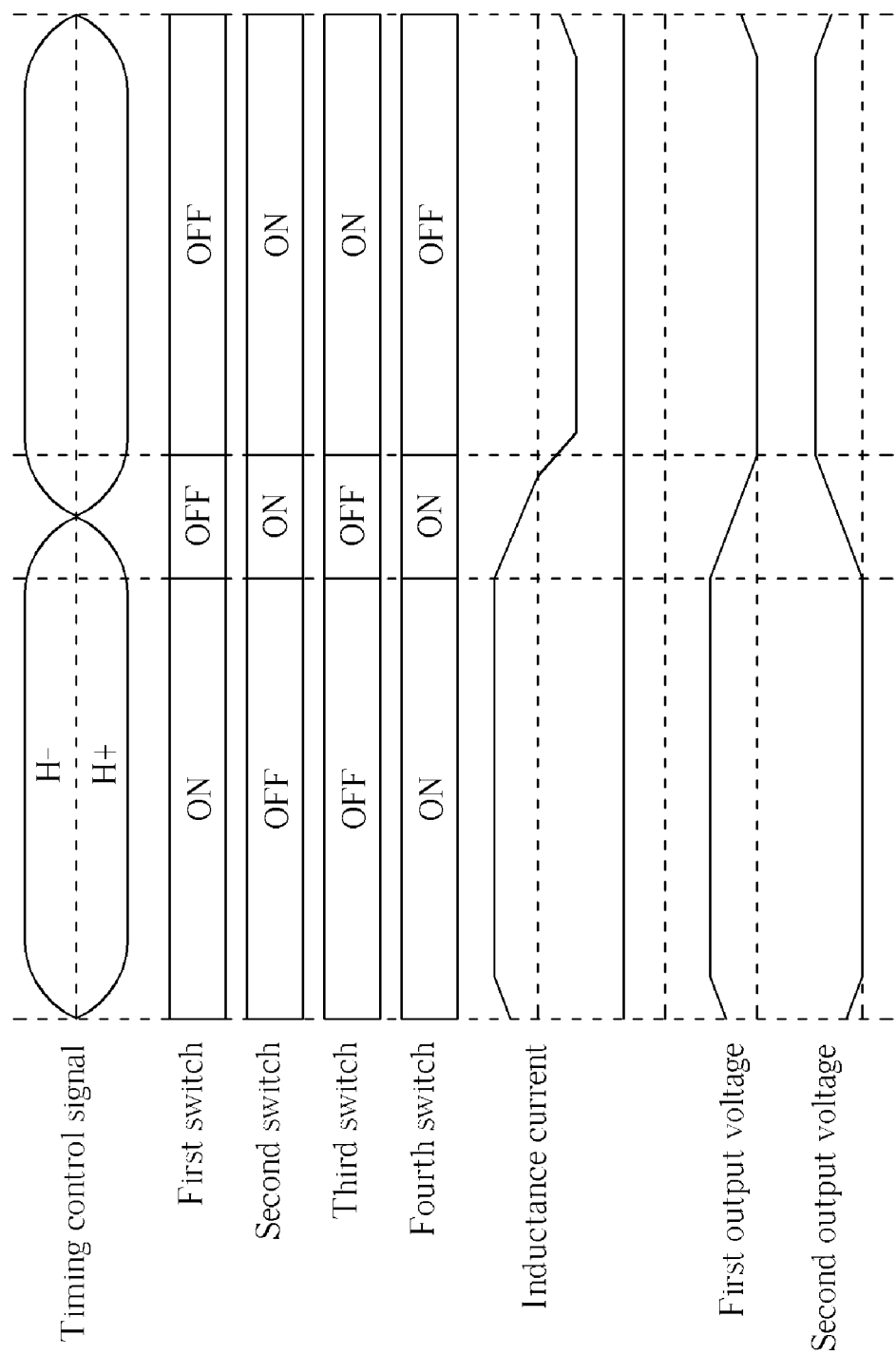
FIG. 2 is a waveform diagram of the signals shown in FIG. 1.
Figure 3:
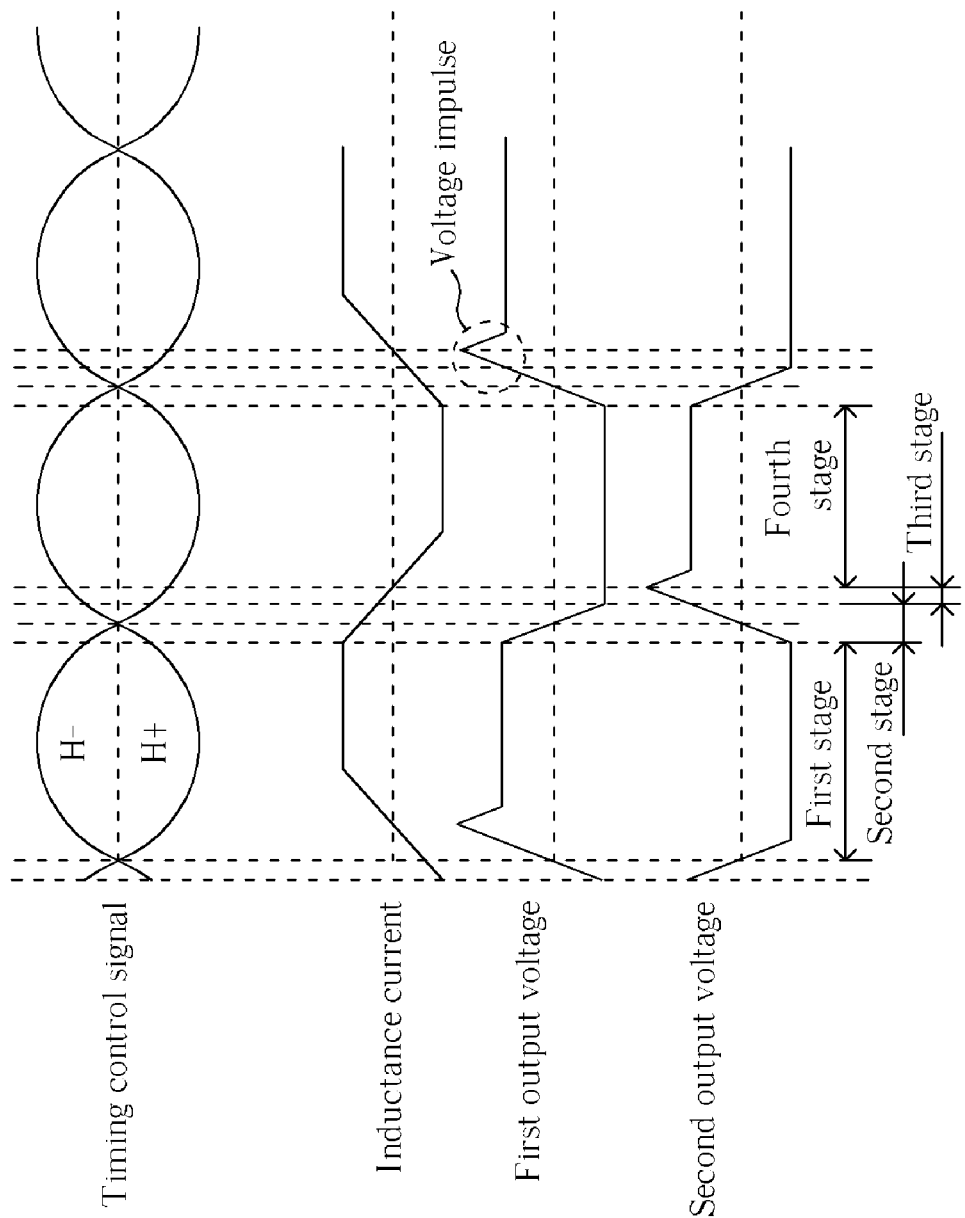
FIG. 3 is a waveform diagram of the signals of FIG. 1 when a high rotation rate of the prior art soft switching DC motor results in a voltage impulse.
Figure 4:
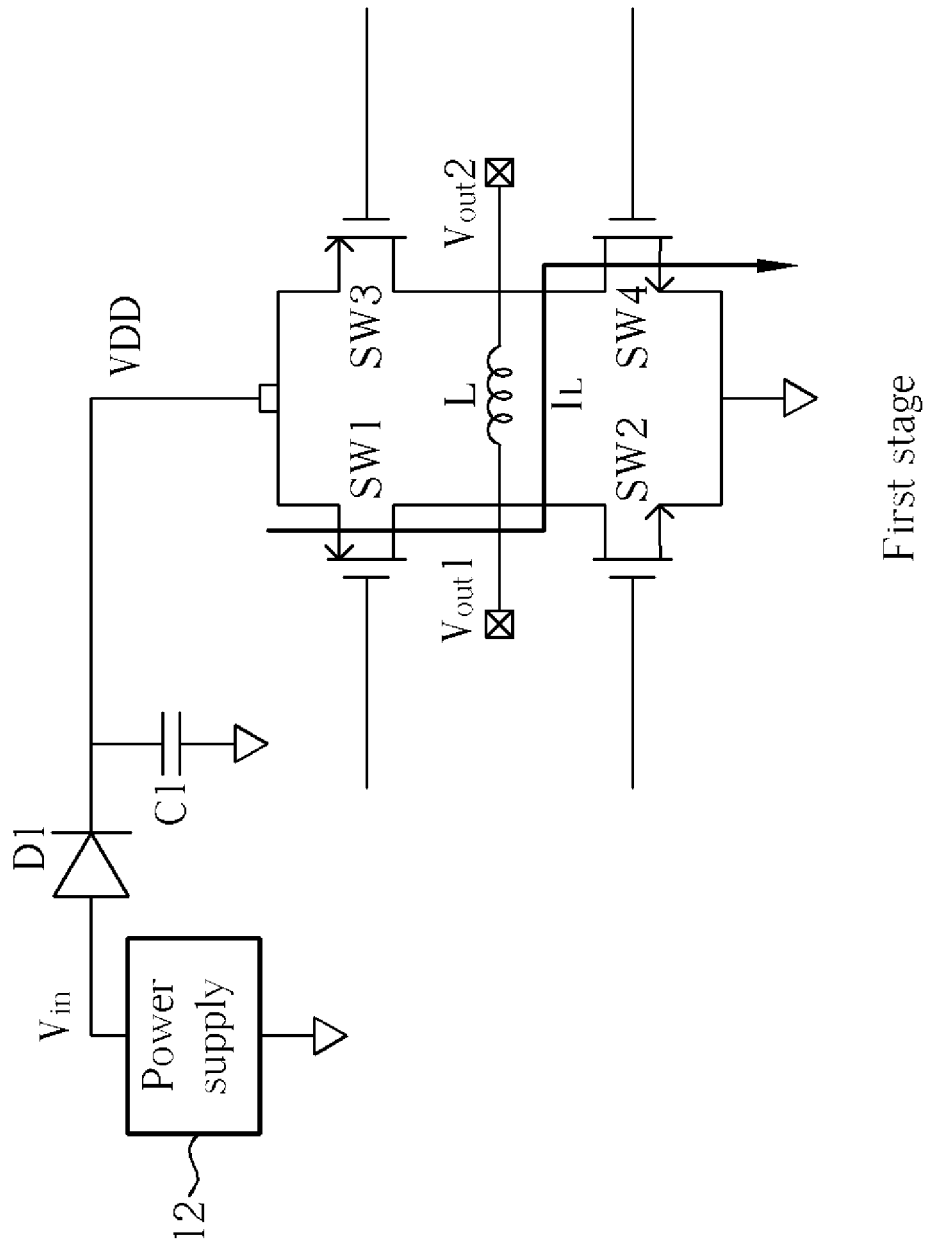
FIG. 4 is a diagram illustrating the flow of an inductance current during the first stage shown in FIG. 3.
Figure 5:
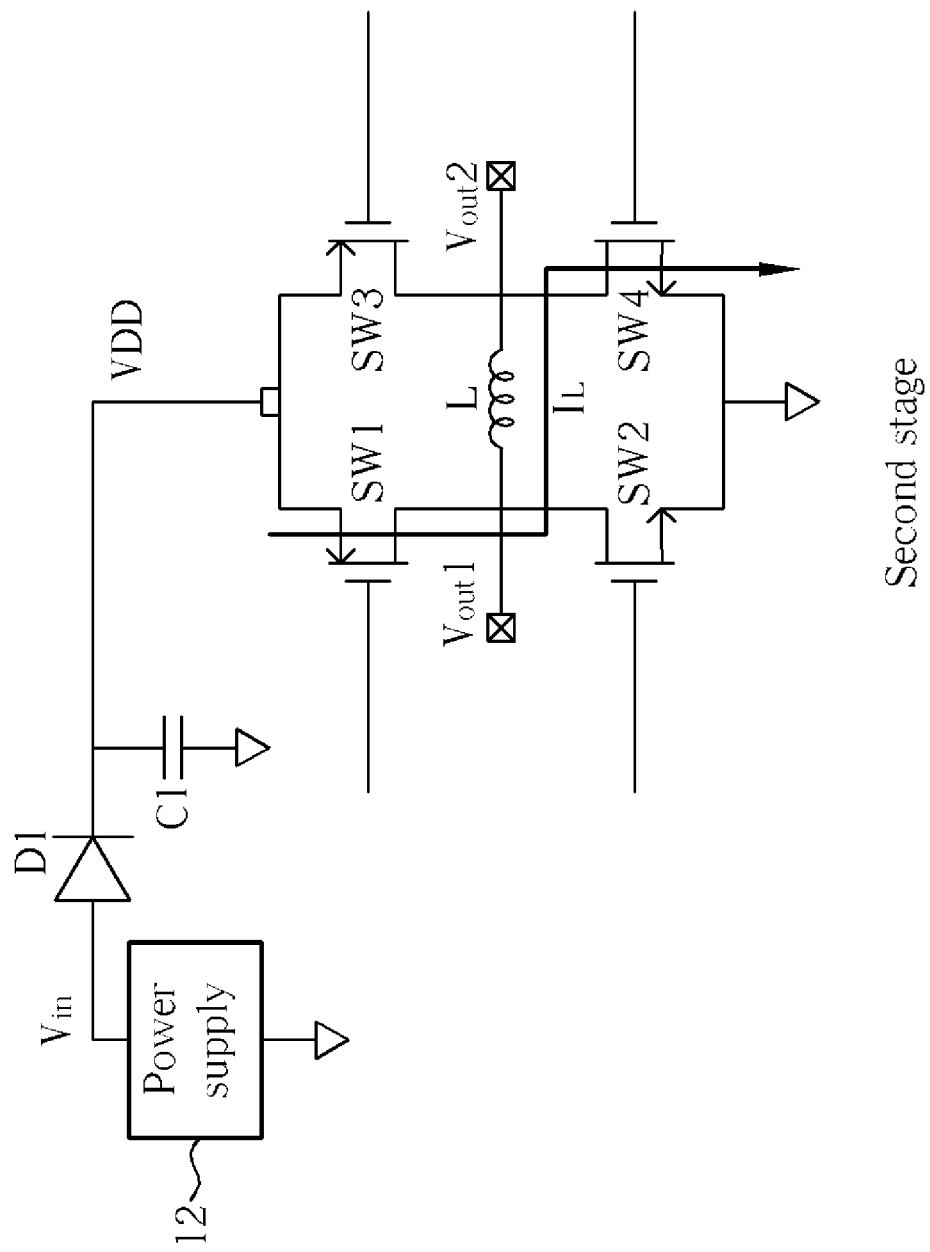
FIG. 5 is a diagram illustrating the flow of the inductance current during the second stage shown in FIG. 3.
Figure 6:
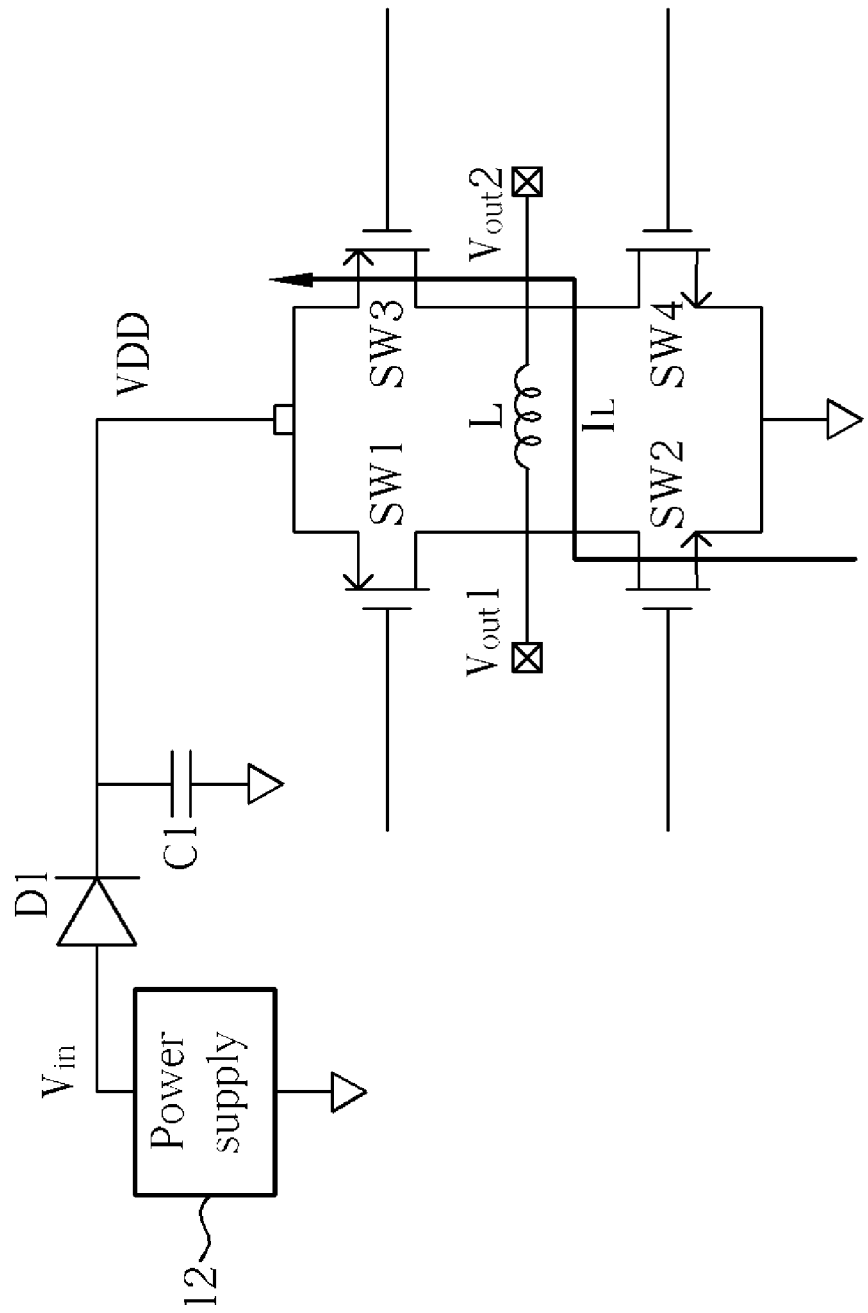
FIG. 6 is a diagram illustrating the flow of the inductance current during the third stage shown in FIG. 3.
Figure 7:
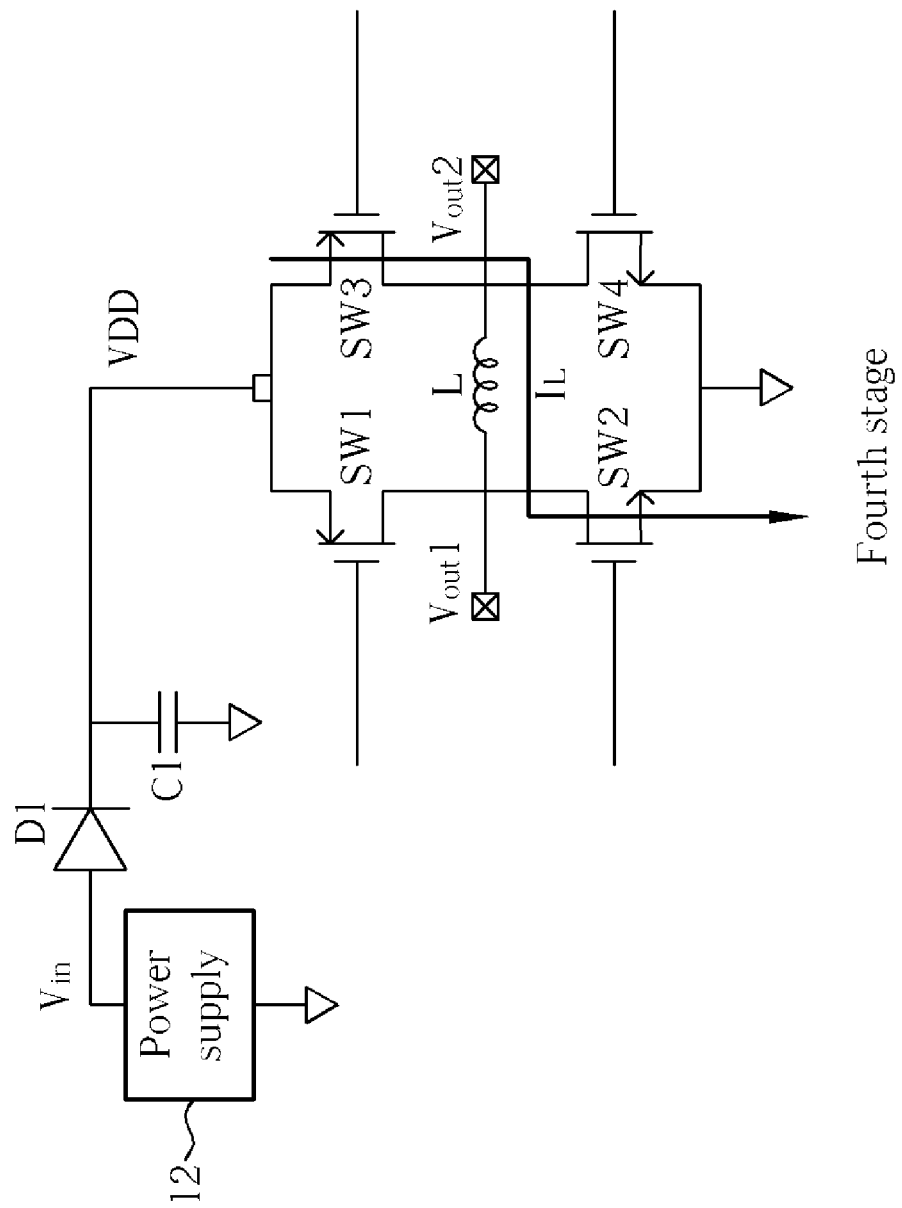
FIG. 7 is a diagram illustrating the flow of the inductance current during the fourth stage shown in FIG. 3.
Figure 8:
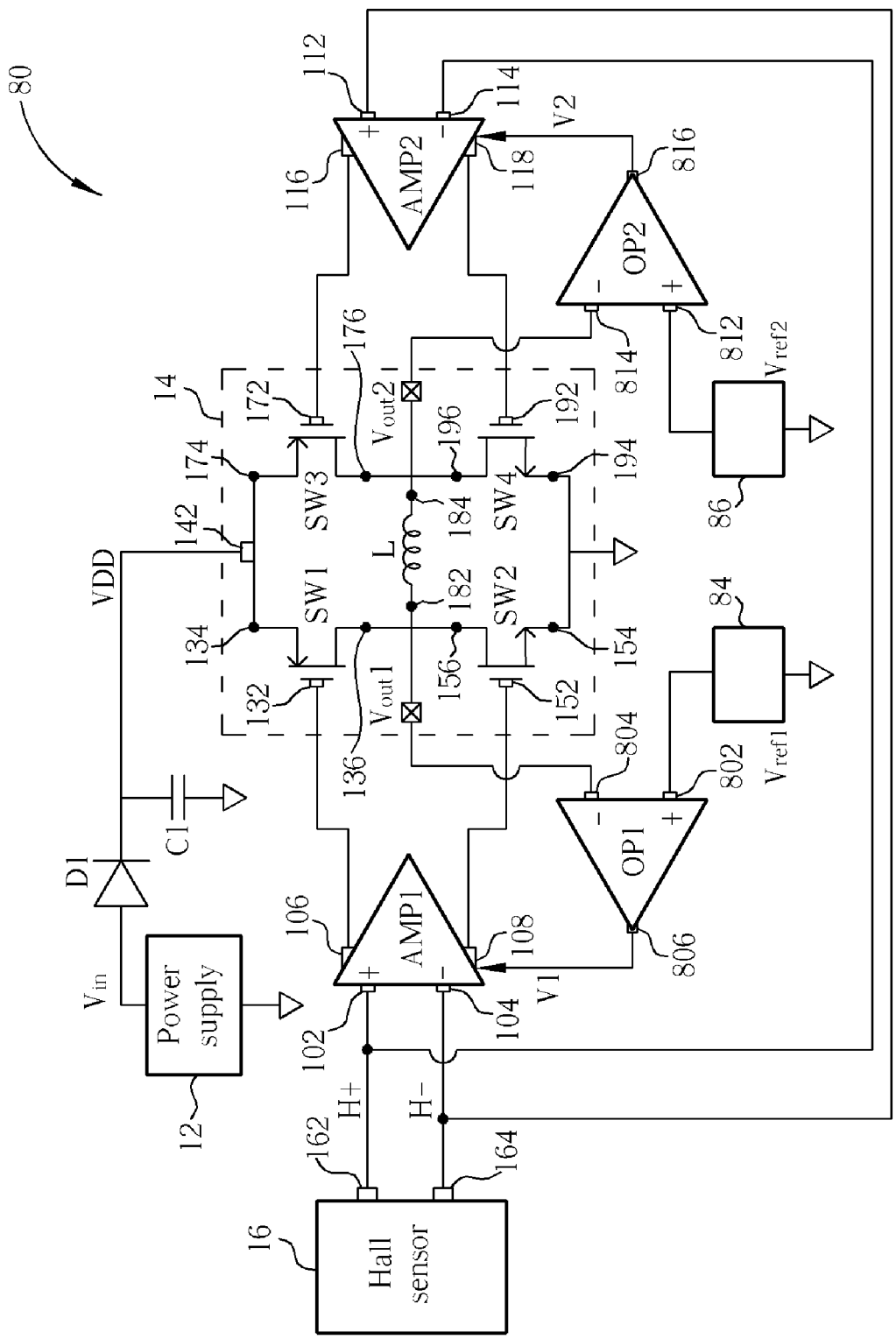
FIG. 8 is a diagram of a soft switching DC motor driver of the present invention.

Please refer to FIG. 8, which is a diagram of a soft switching DC motor driver 80 of the present invention. The soft switching DC motor driver 80 comprises a power supply 12, an input capacitor C1, a Hall sensor 16, a first amplifier AMP1, a second amplifier AMP2, a full-bridge driver circuit 14, a first operational amplifier OP1, a second operational amplifier OP2, a first reference voltage generator 84, and a second reference voltage generator 86. The power supply 12 is for generating an input voltage Vin. The input capacitor C1 is coupled to the power supply 12. A voltage difference between both terminals of the input capacitor C1 is a supply voltage VDD. The Hall sensor 16 has a first output end 162 for generating a first timing control signal H+, and a second output end 164 for generating a second timing control signal H−. The first amplifier AMP1 has a first input end 102 coupled to the first output end 162 of the Hall sensor 16, a second input end 104 coupled to the second output end 164 of the Hall sensor 16, a first output end 106, and a second output end 108. The first amplifier AMP1 is for amplifying signals inputted at the first input end 102 and the second input end 104. The second amplifier AMP2 has a first input end 112 coupled to the second output end 164 of the Hall sensor 16, a second input end 114 coupled to the first output end 162 of the Hall sensor 16, a first output end 116, and a second output end 118. The second amplifier AMP2 is for amplifying signals inputted at the first terminal 112 and the second terminal 114. The full-bridge driver circuit 14 has an input end 142 coupled to the power supply 12 and the input capacitor C1, and the voltage at the input end 142 is the supply voltage VDD. The full-bridge driver circuit 14 comprises a first switch SW1, a second switch SW2, a third switch SW3, a fourth switch SW4, and an inductor L. The first switch SW1 has a control terminal 132 coupled to the first output end 106 of the first amplifier AMP1, an input end 134 coupled to the power supply 12 and the input capacitor C1, and an output end 136 for generating a first output voltage Vout1. The second switch SW2 has a control terminal 152 coupled to the second output end 108 of the first amplifier AMP1, an input end 154 coupled to ground, and an output end 156 coupled to the output end 136 of the first switch SW1. The third switch SW3 has a control terminal 172 coupled to the first output end 116 of the second switch SW2, an input end 174 coupled to the power supply 12 and the input capacitor C1, and an output end 176 for generating a second output voltage Vout2. The fourth switch SW4 has a control terminal 192 coupled to the second output end 118 of the second amplifier AMP2, an input end 194 coupled to ground, and an output end 196 coupled to the output end 176 of the third switch SW3. The inductor L has a first input end 182 coupled to the first switch SW1 and the second switch SW2, and a second input end 184 coupled to the third switch SW3 and the fourth switch SW4.

Please refer to FIG. 8 again. A first input end 802 of the first operational amplifier OP1 is for receiving a first reference voltage Vref1. The magnitude of the first reference voltage Vref1 is (VDD+VS), and VS is a tiny positive voltage. A second input end 804 of the first operational amplifier OP1 is for receiving the first output voltage Vout1. An output end 806 of the first operational amplifier OP1 is for generating a voltage V1 to control the output stage of the first amplifier AMP1. Under normal operations, the potential of the first output voltage Vout1 is lower than the potential of the first reference voltage Vref1, therefore, the first operational amplifier OP1 is turned off so that it does not affect the control of the first amplifier AMP1 over the full-bridge driver circuit 14. When the potential of the first output voltage Vout1 is higher than the first reference voltage Vref1, a feedback circuit of the first operational amplifier OP1 begins working, transmits current signals for controlling the output stage of the first amplifier AMP1, and fixes the potential of the first output voltage Vout1 at (VDD+VS) with a negative feedback mechanism. Similarly, a first input end 812 of the second operational amplifier OP2 is for receiving the second reference voltage Vref2, whose potential is (VDD+VS). A second input end 814 of the second operational amplifier OP2 is for receiving the second output voltage Vout2. An output end 816 of the second operational amplifier OP2 is for generating a voltage V2 to control the output stage of the second amplifier AMP2. Under normal operations, the potential of the second output voltage Vout2 is lower than the voltage of the second reference voltage Vref2, therefore, the second operational amplifier OP2 is turned off so that it does not affect the control of the second amplifier AMP2 over the full-bridge driver circuit 14. When the potential of the second output voltage Vout2 is higher than the potential of the second reference voltage Vref2, a feedback circuit of the second operational amplifier OP2 begins working, transmits current signals for controlling the output stage of the second amplifier AMP2, and fixes the potential of the second output voltage Vout2 at (VDD+VS) with the negative feedback mechanism.

Figure 9:
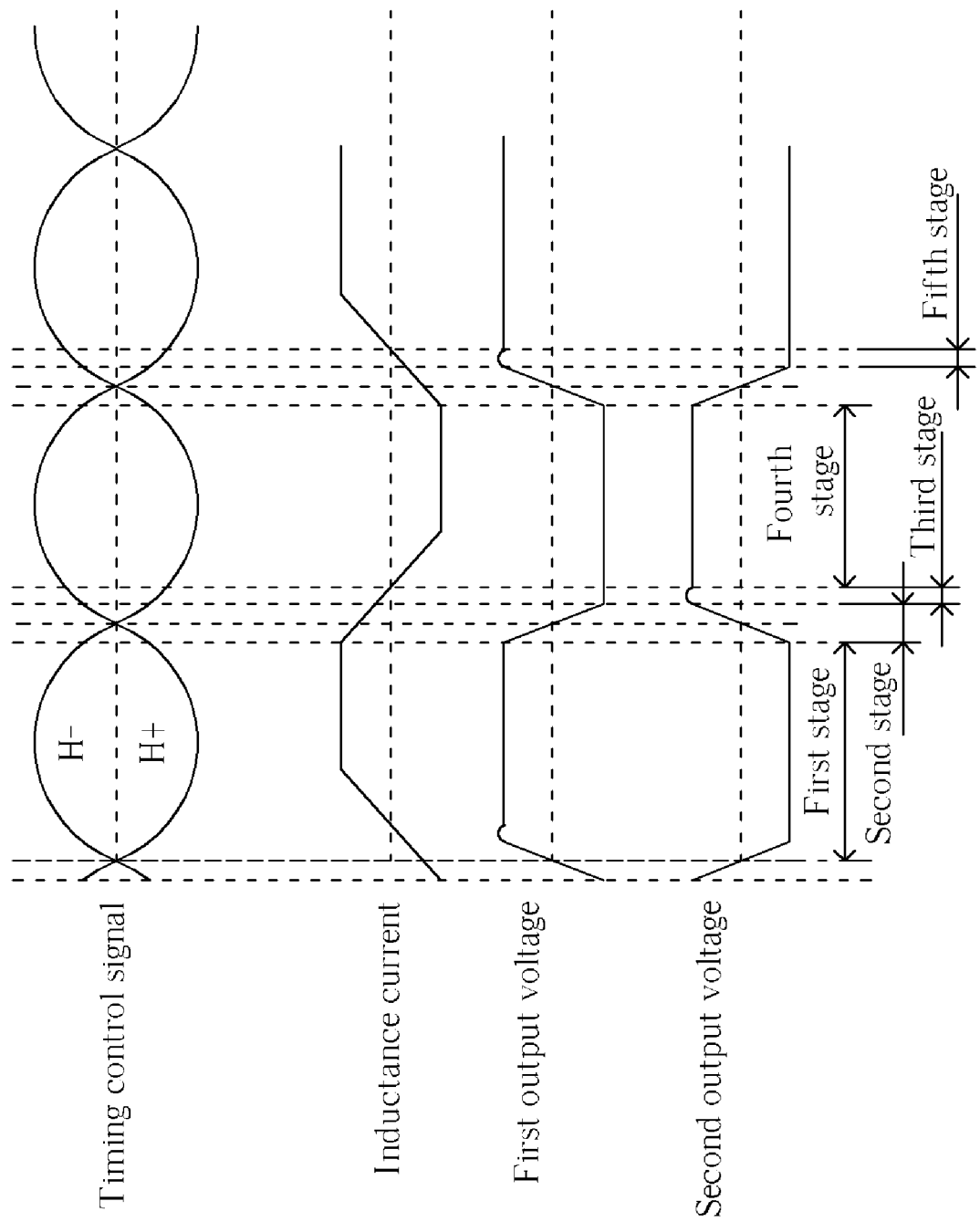
FIG. 9 is a waveform diagram of the signals shown in FIG. 8 under a high rotation rate of the soft switching DC motor of the present invention.

Please refer to FIG. 9, which is a waveform diagram of the signals shown in FIG. 8 under a high rotation rate of the soft switching DC motor driver 80 of the present invention. During the first stage, and when the first timing control signal H+ is high whereas the second timing control signal H− is low, the inductance current $I_L$ flows from the first output voltage Vout1 to the second output voltage Vout2. At this time, the first output voltage Vout1 is high, and the second output voltage Vout2 is low. During the second stage and the transition of the first timing control signal H+ and the second timing control signal H−, the inductance current $I_L$ releases energy through the second switch SW2 and the fourth switch SW4. During the third stage and when the potential of the second output voltage Vout2 is raised to (VDD+VS), the second operational amplifier OP2 begins working after detecting the raised second output voltage Vout2, controls the output stage of the second amplifier AMP2, and further controls the control terminals of the third switch SW3 and the fourth switch SW4. At last, a negative feedback system is generated by a loop gain of the second operational amplifier OP2, and the potential of the second output voltage Vout2 is fixed at (VDD+VS). During the fourth stage, the feedback loop of the second operational amplifier OP2 is off, and the second amplifier AMP2 controls the third switch SW3 and the fourth switch SW4 instead.

Figure 10:
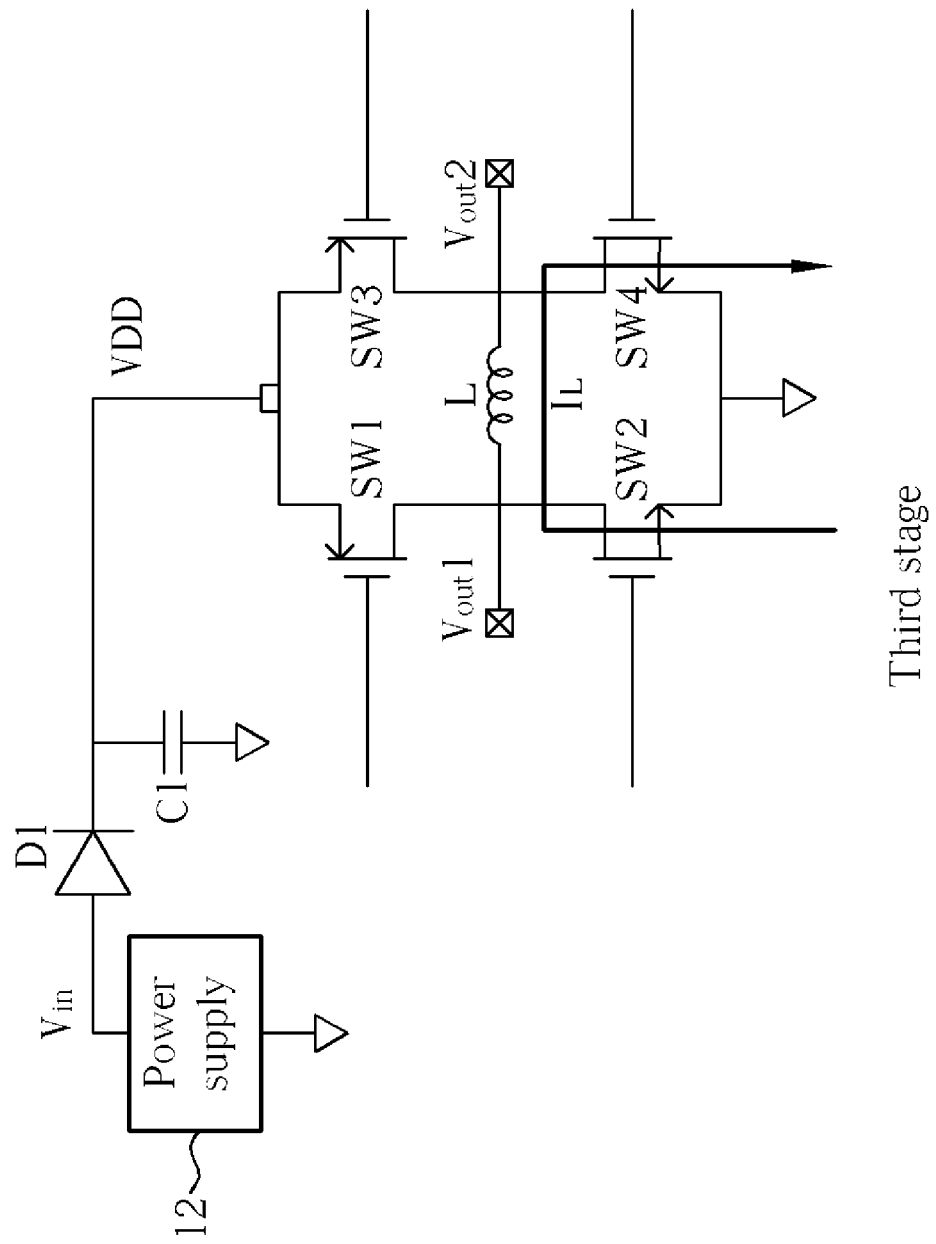
FIG. 10 is a diagram illustrating the flow of an inductance current during the third stage shown in FIG. 9.

Please refer to FIG. 10, which is a diagram illustrating the flow of the inductance current $I_L$ during the third stage shown in FIG. 9. During the third stage, and when the potential of the second output voltage Vout2 is raised to (VDD+VS), the second operational amplifier OP2 begins working after detecting the raised second output voltage Vout2, controls the output stage of the second amplifier AMP2 through the voltage V2, and further controls the third switch SW3 and the fourth switch SW4. Since a negative feedback loop is generated by the loop gain of the second operational amplifier OP2, the connection between the first input end 812 and the second input end 814 of the second operational amplifier OP2 is virtual shorted so that the potential of the second output voltage Vout2 is fixed at (VDD+VS). At this time, the inductance current $I_L$ releases energy through the second switch SW2 and the fourth switch SW4 until the inductance current is completely dissipated. The negative feedback circuit turns off the second operational amplifier OP2 while the potential of the second output voltage Vout2 is lower than (VDD+VS), then the operations of the system of the soft switching DC motor driver 80 return to normal.

Figure 11:
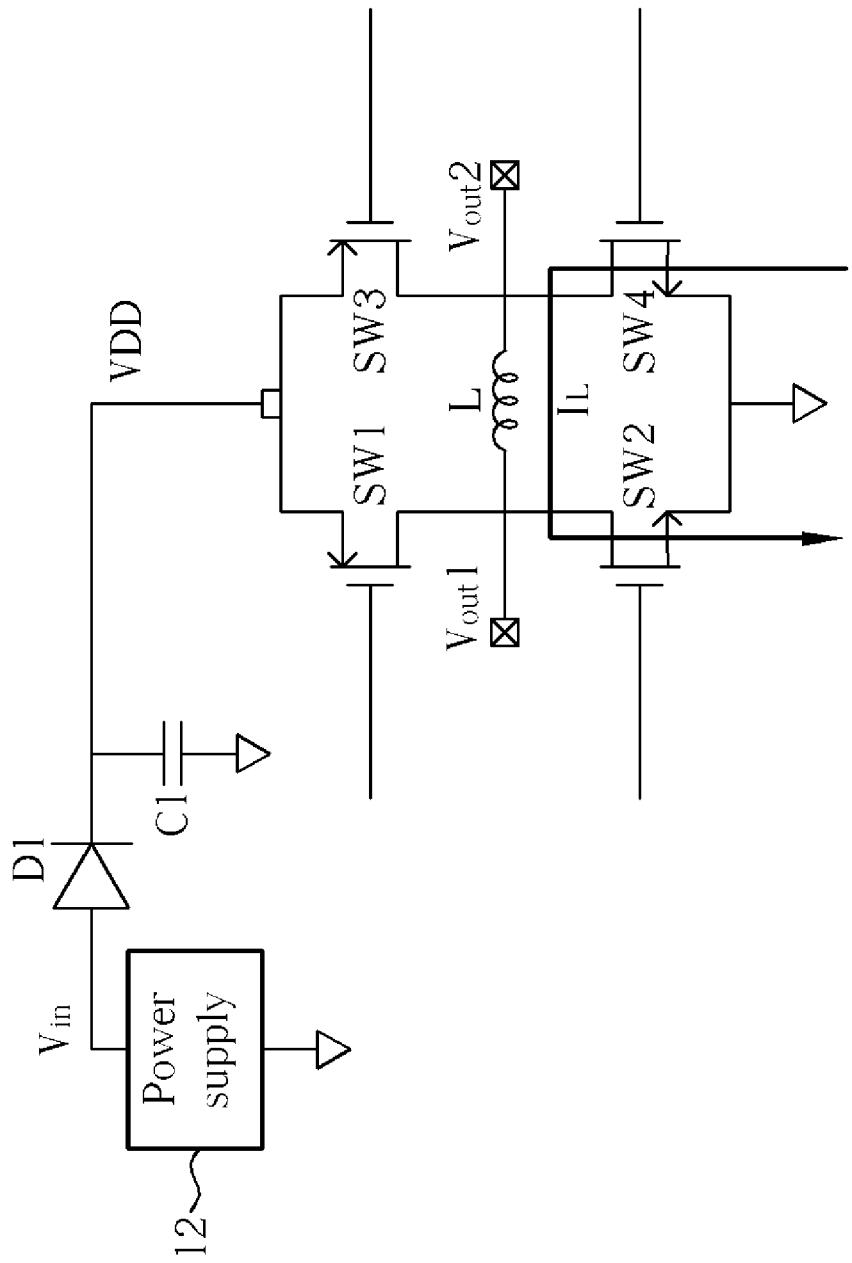
FIG. 11 is a diagram illustrating the flow of the inductance current during the fifth stage shown in FIG. 9.

Please refer to FIG. 11, which is a diagram illustrating the flow of the inductance current $I_L$ during the fifth stage shown in FIG. 9. During the fifth stage, and when the first output voltage Vout1 is raised to (VDD+VS), the first operational amplifier OP1 begins working after detecting the raised first output voltage Vout1, controls the output stage of the first amplifier AMP1 through the voltage V1, and further controls the first switch SW1 and the second switch SW2. Since a negative feedback loop is generated by a loop gain of the first operational amplifier OP1, the connection between the first input end 802 and the second input end 804 of the first operational amplifier OP1 is virtual shorted so that the potential of the first output voltage Vout1 is fixed at (VDD+VS). At this time, the inductance current $I_L$ releases energy through the second switch SW2 and the fourth switch SW4 until the inductance current $I_L$ is dissipated. The negative feedback circuit turns off the first operational amplifier OP1 while the potential of the first output voltage Vout1 is lower than (VDD+VS), and the operations of the system of the soft switching DC motor driver 80 return to normal.

The abovementioned embodiments are presented merely for describing the present invention, and in no way should be considered to be limitations of the scope of the present invention. The potentials of the first reference voltage Vref1 and the second reference voltage Vref2 are both (VDD+VS) in the abovementioned embodiments, though, are not limited to (VDD+VS) in the present invention. However, the potentials of the first reference voltage Vref1 and the second reference voltage Vref2 are definitely higher than the supply voltage VDD for not resulting in errors of the soft switching DC motor driver of the present invention. Moreover, the first switch SW1, the second switch SW2, the third switch SW3, and the fourth switch SW4 are not limited to be metal-oxide semiconductor transistors or bipolar-junction transistors, and other elements may also be utilized for implementing the abovementioned switches.

From the above descriptions, the present invention provides a soft switching DC motor driver 80 for avoiding reverse current. By virtual shorting the connection between the first input end 802 and the second input end 804 of the first operational amplifier OP1, the potential of the first output voltage Vout1 is fixed at (VDD+VS) until the inductance current $I_L$ is dissipated for preventing the inductance current $I_L$ from reversely flowing to the supply voltage VDD thereby causing damage to the controllers and the drivers of the soft switching DC motor driver 80. The present invention may also be applied in DC motors having a low rotation rate or a high rotation rate for effectively preventing a voltage impulse and enhancing the reliability and the effective operational range of the system of the soft switching DC motor driver.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A soft switching DC motor driver to avoid reverse current comprising:
   a power supply for generating an input voltage;
   an input capacitor coupled to the power supply;
   a Hall sensor having a first output end for generating a first timing control signal, and a second output end for generating a second timing control signal;
   a first amplifier having a first input end coupled to the first output end of the Hall sensor, a second input end coupled to the second output end of the Hall sensor, a first output end, and a second output end, the first amplifier being utilized for amplifying the first input signal and the second input signal of the first amplifier;
   a second amplifier having a first input end coupled to the second output end of the Hall sensor, a second input end coupled to the first output end of the hall sensor, a first output end, and a second output end, the second amplifier being utilized for amplifying the first input signal and the second input signal of the second amplifier;
   a full-bridge driver circuit having an input end coupled to the power supply and the input capacitor, a first control terminal coupled to the first output end of the first amplifier, a second control terminal coupled to the second output end of the first amplifier, a third control terminal coupled to the first output end of the second amplifier, a fourth control terminal coupled to the second output end of the second amplifier, a first output end for generating a first output voltage, and a second output end for generating a second output voltage; and
   a first operational amplifier having a first input end for receiving a first reference voltage, a second input end coupled to the first output end of the full-bridge driver circuit, and an output end coupled to a control terminal of the first amplifier, the first operational amplifier for controlling output voltages of the first amplifier.

2. The soft switching DC motor driver of claim 1, further comprising:
   a second operational amplifier having a first input end for receiving a second reference voltage, a second input end coupled to the second output end of the full-bridge driver circuit, and an output end coupled to a control terminal of the second amplifier, the second operational amplifier for controlling output voltages of the second amplifier.

3. The soft switching DC motor driver of claim 1, further comprising:
   a protector coupled to the power supply and the input capacitor for protecting the power supply.

4. The soft switching DC motor driver of claim 3 wherein the protector is a diode.

5. The soft switching DC motor driver of claim 1, further comprising:
   a first reference voltage generator coupled to the first input end of the first operational amplifier for generating the first reference voltage.

6. The soft switching DC motor driver of claim 2, further comprising:

a second reference voltage generator coupled to the first input end of the second operational amplifier for generating the second reference voltage.

7. The soft switching DC motor driver of claim 1 wherein the full-bridge driver circuit comprises:

a first switch having a control terminal coupled to the first output end of the first amplifier, an input end coupled to the power supply and the input capacitor, and an output end for generating the first output voltage;

a second switch having a control terminal coupled to the second output end of the first amplifier, an input end coupled to ground, and an output end coupled to the output end of the first switch;

a third switch having a control terminal coupled to the first output end of the second amplifier, an input end coupled to the power supply and the input capacitor, and an output end for generating the second output voltage;

a fourth switch having a control terminal coupled to the second output end of the second amplifier, an input end coupled to ground, and an output end coupled to the output end of the third switch; and an inductor having a first input end coupled to the first switch and the second switch, and a second input end coupled to the third switch and the fourth switch.

8. The soft switching DC motor driver of claim 7 wherein the first switch, the second switch, the third switch, and the fourth switch are metal-oxide semiconductor (MOS) transistors.

9. The soft switching DC motor driver of claim 7 wherein the first switch and the third switch are P-type metal-oxide semiconductor transistors, and the second switch and the fourth switch are N-type metal-oxide semiconductor transistors.

10. The soft switching DC motor driver of claim 7 wherein the first switch, the second switch, the third switch, and the fourth switch are bipolar junction transistors (BJT).

11. The soft switching DC motor driver of claim 7 wherein the first switch and the third switch are npn bipolar junction transistors, and the second switch and the fourth switch are pnp bipolar junction transistors.

* * * * *